United States Patent
Sakhnini et al.

(10) Patent No.: US 11,962,448 B2
(45) Date of Patent: Apr. 16, 2024

(54) TECHNIQUES FOR IMPROVING WAVEFORM RELIABILITY IN WIRELESS COMMUNICATIONS

(71) Applicant: QUALCOMM Incorporated, San Diego, CA (US)

(72) Inventors: Iyab Issam Sakhnini, San Diego, CA (US); Hemant Saggar, Irvine, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/573,251

(22) Filed: Jan. 11, 2022

(65) Prior Publication Data

US 2023/0224200 A1     Jul. 13, 2023

(51) Int. Cl.
   *H04L 5/00*       (2006.01)
   *H04L 27/26*    (2006.01)

(52) U.S. Cl.
   CPC ...... *H04L 27/2605* (2013.01); *H04L 27/2618* (2013.01); *H04L 27/2636* (2013.01); *H04L 5/001* (2013.01)

(58) Field of Classification Search
   CPC ............ H04L 27/2605; H04L 27/2618; H04L 27/2634; H04L 27/2636; H04L 5/001; H04L 5/0007; H04L 5/0044
See application file for complete search history.

(56) References Cited

U.S. PATENT DOCUMENTS

| 2019/0028237 A1* | 1/2019 | Pan ................... H04L 27/2636 |
| 2023/0261906 A1* | 8/2023 | Kim ................... H04L 27/2605 |
| | | 370/252 |

FOREIGN PATENT DOCUMENTS

WO     WO-2017096121 A1 *    6/2017 ........... H04B 7/0408

OTHER PUBLICATIONS

Kumar et al., Implementation of 64-Bits Radix—8 IFFT for Computation Speed by IDIF using Verilog, Jan. 2020, International Journal of Recent Technology and Engineering (IJRTE), ISSN: 2277-3878, vol. 8 Issue-5, p. 5274-5279 (6 pages). (Year: 2020).*
Rajabzadeh et al., Power Spectral Analysis of UW-OFDM Systems, Jun. 2018, IEEE Transactions on Communications, vol. 66, No. 6, p. 2685-2695 (11 pages). (Year: 2018).*

\* cited by examiner

*Primary Examiner* — Brandon M Renner
(74) *Attorney, Agent, or Firm* — Dalei Dong; ArentFox Schiff LLP

(57) ABSTRACT

Aspects described herein relate to adding a set of redundant subcarriers to a set of data subcarriers to be transmitted in a unique-word orthogonal frequency division multiplexing (UW-OFDM) waveform, interleaving, based on a permutation matrix, the set of redundant subcarriers with the set of data subcarriers to generate a permutation of subcarriers, mapping the permutation of subcarriers as input to an inverse fast Fourier transform (IFFT), and generating the UW-OFDM waveform based on output of the IFFT. Other aspects relate to receiving and processing the UW-OFDM waveform.

26 Claims, 9 Drawing Sheets

US 11,962,448 B2

TECHNIQUES FOR IMPROVING WAVEFORM RELIABILITY IN WIRELESS COMMUNICATIONS

FIELD OF THE DISCLOSURE

Aspects of the present disclosure relate generally to wireless communication systems, and more particularly, to techniques for generating waveforms for wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, waveforms generated for wireless communications can include cyclic prefix (CP)-orthogonal frequency division multiplexing (OFDM), single carrier (SC)-OFDM in a frequency division implementation, such as discrete Fourier transform (DFT)-spread (S)-OFDM, or single carrier-quadrature amplitude modulation (QAM) in time division implementation. In addition, a given waveform can include CP or guard interval (GI) to avoid inter-symbol interference between symbols of the waveform when transmitted or received in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication is provided that includes adding a set of redundant subcarriers to a set of data subcarriers to be transmitted in a unique-word orthogonal frequency division multiplexing (UW-OFDM) waveform, wherein the set of redundant subcarriers is based at least on multiple head samples to be included in the UW-OFDM waveform, interleaving, based on a permutation matrix, the set of redundant subcarriers with the set of data subcarriers to generate a permutation of subcarriers, mapping the permutation of subcarriers as input to an inverse fast Fourier transform (IFFT), and generating the UW-OFDM waveform based on output of the IFFT.

In another aspect, a method for wireless communication is provided that includes receiving a UW-OFDM waveform, generating a mapping of subcarriers by performing a fast Fourier transform (FFT) of the UW-OFDM waveform, demapping, from the mapping of subcarriers, a permutation of a set of redundant subcarriers and a set of data subcarriers, wherein the set of redundant subcarriers is based at least on multiple head samples included in the UW-OFDM waveform, separating, based on a permutation matrix, the permutation of the set of redundant subcarriers and the set of data subcarriers, and processing the set of data subcarriers to obtain data transmitted in the UW-OFDM waveform.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
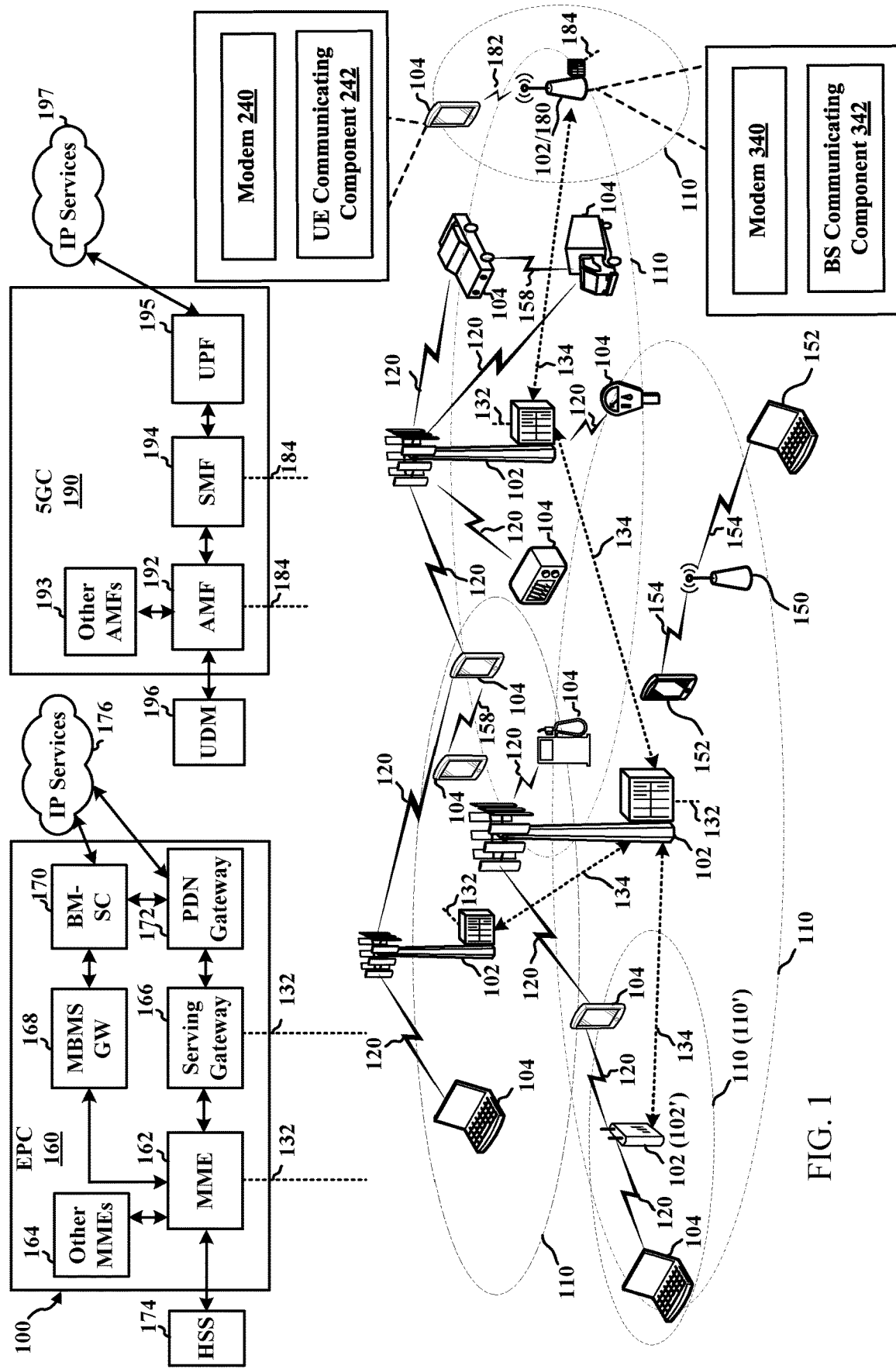
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to generating waveforms in wireless communications to improve reliability for transmitting or receiving the waveforms. In wireless communication technologies, such as fifth generation (5G) new radio (NR), different waveforms may be possible for wireless communications (e.g., for downlink, uplink, and/or sidelink operation). The waveforms may include cyclic prefix (CP)-orthogonal frequency division multiplexing (OFDM), single carrier-OFDM in a frequency division (FD) implementation, such as discrete Fourier transform (DFT)-spread (S)-OFDM, or single carrier-quadrature amplitude modulation (QAM) in time division (TD) implementation, which may each have associated advantages.

For example, CP-OFDM can be CP-based and may have higher complexity, but may provide a single tap frequency domain equalization (FDE), efficient bandwidth (BW) utilization, simplified frequency division multiplexing (FDM), increased subcarrier spacing (SCS), higher-order multiple-input multiple-output (MIMO), etc. In another example, single carrier FD implementations may use GP or guard interface (GI) and may have higher complexity, but may also provide single tap FDE, efficient BW utilization, FDM with peak-to-average-power-ratio (PAPR) impact, and increased SCS. In another example, single carrier TD implementations may use CP or GI and may have lower complexity, may provide a single tap FDE or time domain equalization (TDE), but may need guard band, may use FDM with guard bands, but may be optimal for lower signal-to-noise ratio (SNR), may use time domain filtering for lower PAPR, etc. In an example, different waveforms can be used for higher bands than for lower bands, as higher bands may have higher phase noise (PN), may benefit from lower PAPR, may possibly increase device complexity, etc.

In generating waveforms for wireless communications, for example, CP or GI can be used to avoid symbol interference between symbols of the waveform. For example, OFDM waveforms can generate a number of OFDM symbols in a slot of multiple OFDM symbols. CP or GI can be generated between each symbol, where CP can be outside of the DFT and GI can be inside of the DFT. CP can convert linear convolution of the transmit symbols with the channel to a circular convolution, which can provide a single tape FDE at the received. CP can be slot contained, can be generated with random data, but may not be easily adaptable to delay spreads. GI can maintain symbol/slot alignment, may use a known sequence of zeros or a unique word (UW), can be utilized for synchronization, channel estimation, or phase tracking, can adapt to delay spreads without changing symbol duration, etc.

For generating a UW-OFDM waveform, for example, GI can be implemented in multiple ways. In one example, the UW-OFDM waveform can use zero-tail (ZT), where zeros are appended at the end (and possibly the beginning) of the symbols. In another example, the UW-OFDM waveform can use UW (and is referred to herein as UW for ease of explanation), where some know signal/sequence is appended to the end (and possibly the beginning) of the modulation symbols. In one example, in generating a UW-OFDM waveform, a systematic approach can be used where separate data and redundant subcarriers (SCs), also referred to herein as tones, can exist at inverse fast Fourier transform (IFFT) input, and where redundant SCs can, on average, have higher power than data SCs. In this approach, position of the redundant SCs can be optimized to improve reliability of the waveform. In another example, in generating a UW-OFDM waveform, a non-systematic approach can be used where each SC includes a mix of data and redundancy (e.g., no differentiation of redundancy from data), where average power on all non-guard SCs can be similar. This approach can achieve reduced total energy as compared to the systematic approach, which may be better for power amplifier. In addition, in this approach, the generator matrix can be optimized to improve reliability of the waveform.

Using the systematic approach, for example, redundant SCs (r) are inserted at the IFFT input, where r is dependent on data (d) and GI (u). To improve reliability of the waveform, mapping the r SCs into the IFFT input can be performed by selecting or determining optimized locations to minimize power requirements at the IFFT. In an example, a permutation matrix (P) can be used to control possible energy increase at the IFFT output. Data samples (x) and GI samples (u) can be determined based on performing IFFT of the data SCs (d) and redundant SCs (r) having a SC mapping (B) and permutation matrix (P) applied. The operation can be represented as:

$$\begin{bmatrix} x \\ u \end{bmatrix} = F_N^{-1} BP \begin{bmatrix} d \\ r \end{bmatrix}$$

where $F_N^{-1}$ is IFFT of length N.

$$\text{If } M = F_N^{-1} BP: \begin{bmatrix} x \\ u \end{bmatrix} = \begin{bmatrix} M_{11} & M_{12} \\ M_{21} & M_{22} \end{bmatrix} \begin{bmatrix} d \\ r \end{bmatrix}, u = M_{21}d + M_{22}r$$

r can be estimated as $\hat{r}=M_{22}^+(u-M_{21}d)$ where $M_{22}^+$ is the pseudo-inverse of $M_{22}$. Other ways to determine $\hat{r}$ can also be used (e.g., QR factorization, singular value decomposition (SVD), etc.).

To reduce the complexity of calculating P and/or reduce the overhead of the redundant SCs, $N_r$ may be chosen to be less than $N_u$, hence $M_{22}$ may have more rows that columns and solving for r can become a least square fitting problem. In this example, the quality of the UW samples, can depend on how good is the fit (how small is the error). This may result to an undesirable power regrowth at the end of the GI, where the power regrowth at the GI end can depend on number of redundant SCs used. Some aspects described herein relate to mitigating power regrowth at least in part by introducing head samples to the OFDM waveform. In addition, whether tail samples or both head and tail samples are used, as described, the redundant SCs used can generate additional overhead. Additional aspects described herein relate to configuring a number and/or distribution of redundant SCs to use in generating the waveform to balance the overhead of redundant SCs with reliability of the waveform in certain scenarios, radio environments, etc., as described further herein.

In an example, adding head samples to a waveform, in addition to tail samples, can improve reliability of the waveform by mitigating power regrowth at the end of the waveform. Allowing for configuration of the number and/or distribution of redundant SCs in generating waveforms can facilitate adapting the waveform to balance overhead and reliability in certain scenarios. Both of these improvements to waveform generation can improve the quality and/or efficiency of wireless communications between devices, which can also allow for conservation of communication resources, and/or can accordingly improve user experience when using a device (e.g., a user equipment (UE)).

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for communicating with another node using a waveform generated using one or more of redundant SCs to result in addition of head samples or tail samples into the waveform, in accordance with aspects described herein. In addition, some nodes may have a modem 340 and BS communicating component 342 for communicating with another node using a waveform generated using one or more of redundant SCs to result in addition of head samples or tail samples into the waveform, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can communicate with a base station 102 using a waveform that is generated with at least one of redundant SCs to introduce head samples or tail samples into the generated waveform. For example, UE communicating component 242 can receive, from the base station 102, downlink signals having a waveform generated with redundant SCs and having head samples or tail samples UE communicating component 242 can receive the waveform, generate a mapping of SCs by performing a fast Fourier transform (FFT), demap a permutation of a set of SCs, separate, based on a permutation matrix, the permutation of the set of SCs and a set of data SCs, and process the data SCs to obtain data transmitted by the waveform. In an example, BS communicating component 342 can transmit, to the UE 104, downlink signals having a waveform generated with at least one of redundant SCs to include head samples or tail samples. BS communicating component 342 can generate the waveform by interleaving, based on a permutation matrix, a set of redundant SCs with a set of data SCs, mapping the set of redundant SCs as input to a IFFT, and generating the waveform based on an output from the IFFT, which can include head samples or tail samples based on the set of redundant SCs.

Though generally shown and described as the base station 102 generating and transmitting the waveform and the UE 104 receiving and processing the waveform, aspects described herein can be used at substantially any nodes of the wireless network. In one example, the UE communicating component 242 can additionally or alternatively include the components and functionality described for the BS communicating component 342 to generate waveforms for transmitting (e.g., to the base station on uplink, to another UE on sidelink, etc.). In another example, the BS communicating component 342 can additionally or alternatively include the components and functionality described for the UE communicating component 242 to receive and processing waveforms received from a UE 104 on uplink.

Turning now to FIGS. 2-9, aspects are depicted with reference to one or more components and one or more methods that may perform the actions or operations described herein, where aspects in dashed line may be optional. Although the operations described below in FIGS. 4 and 6-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
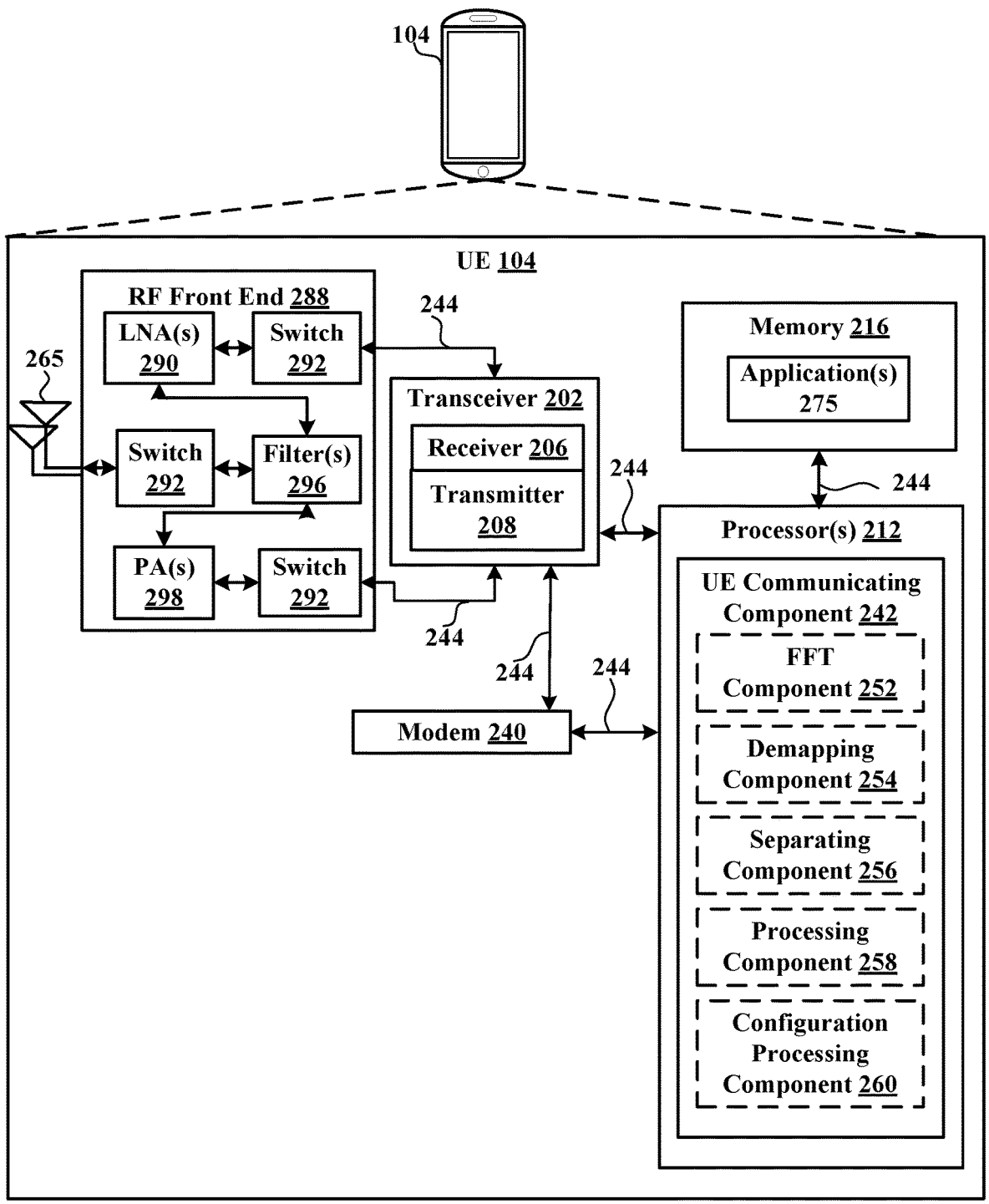
FIG. 2 is a block diagram illustrating an example of a user equipment (UE), in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for communicating with another node using a waveform generated using a set of redundant SCs, which can introduce head samples or tail samples into the waveform, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a FFT component 252 for performing an FFT of a waveform to generate a set of SCs, a demapping component 254 for demapping a permutation of a set of redundant SCs and data SCs from the set of SCs, a separating component 256 for separating, based on a permutation matrix, the set of redundant SCs and the set of data SCs from the permutation, a processing component 258 for processing the data SCs to obtain data transmitted by the waveform, and/or a configuration processing component 260 for processing one or more configurations for obtaining parameters or instructions for performing the demapping, separating, processing, etc., in accordance with aspects described herein.

In an aspect, the processor(s) 212 may correspond to one or more of the processors described in connection with the UE in FIG. 9. Similarly, the memory 216 may correspond to the memory described in connection with the UE in FIG. 9.

Figure 3:
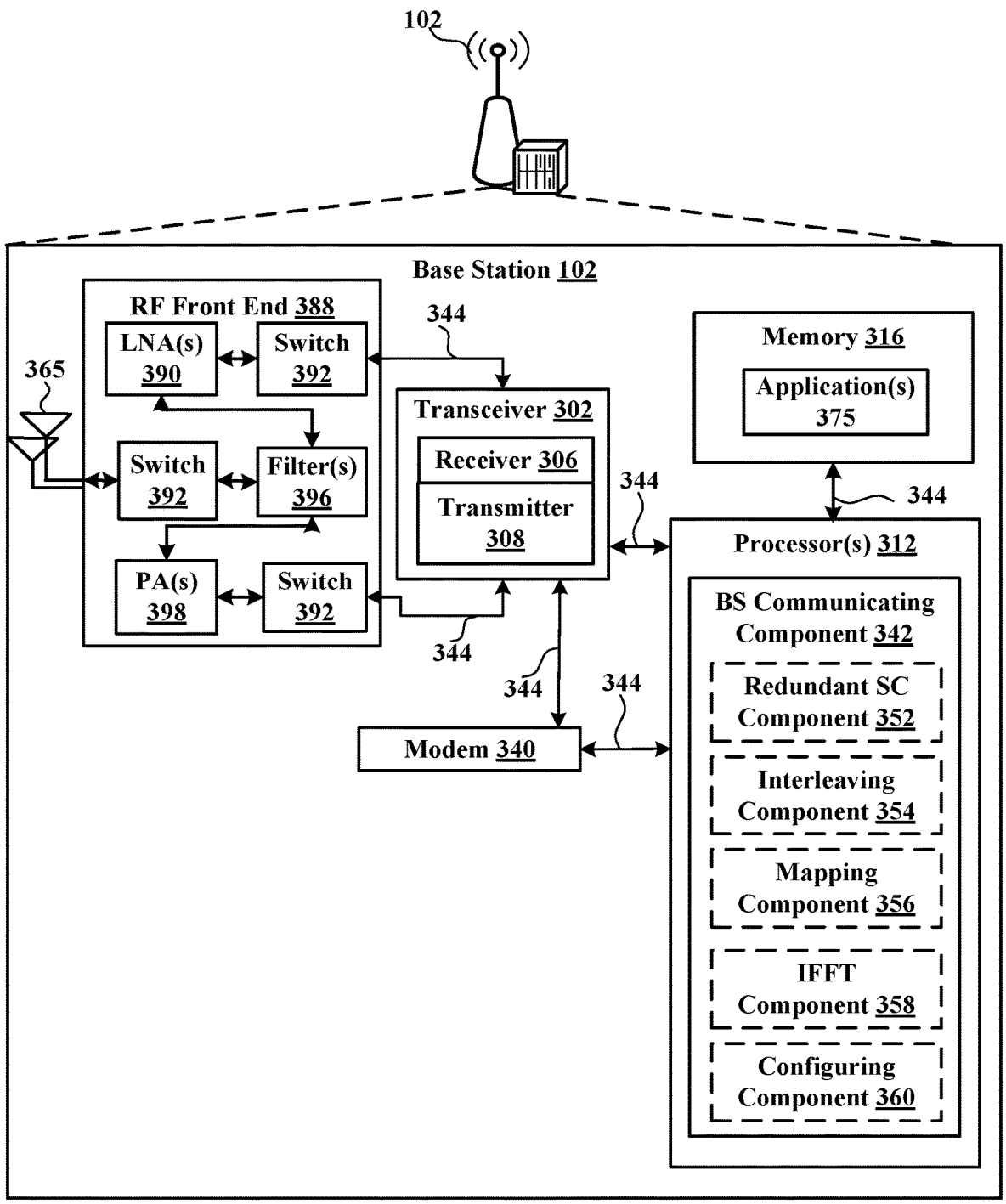
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for communicating with another node using a waveform generated using a set of redundant SCs, which can introduce head samples or tail samples into the waveform, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a redundant SC component 352 for adding redundant SCs to a set of data SCs, an interleaving component 354 for interleaving the redundant SCs and the set of data SCs based on a permutation matrix, a mapping component 356 for mapping the permutation of SCs as input to a IFFT, and IFFT component 358 for performing an IFFT of the permutation of SCs, and/or a configuring component 360 for configuring one or more parameters or instructions for processing the waveform, in accordance with aspects described herein.

In an aspect, the processor(s) 312 may correspond to one or more of the processors described in connection with the base station in FIG. 9. Similarly, the memory 316 may correspond to the memory described in connection with the base station in FIG. 9.

Figure 4:
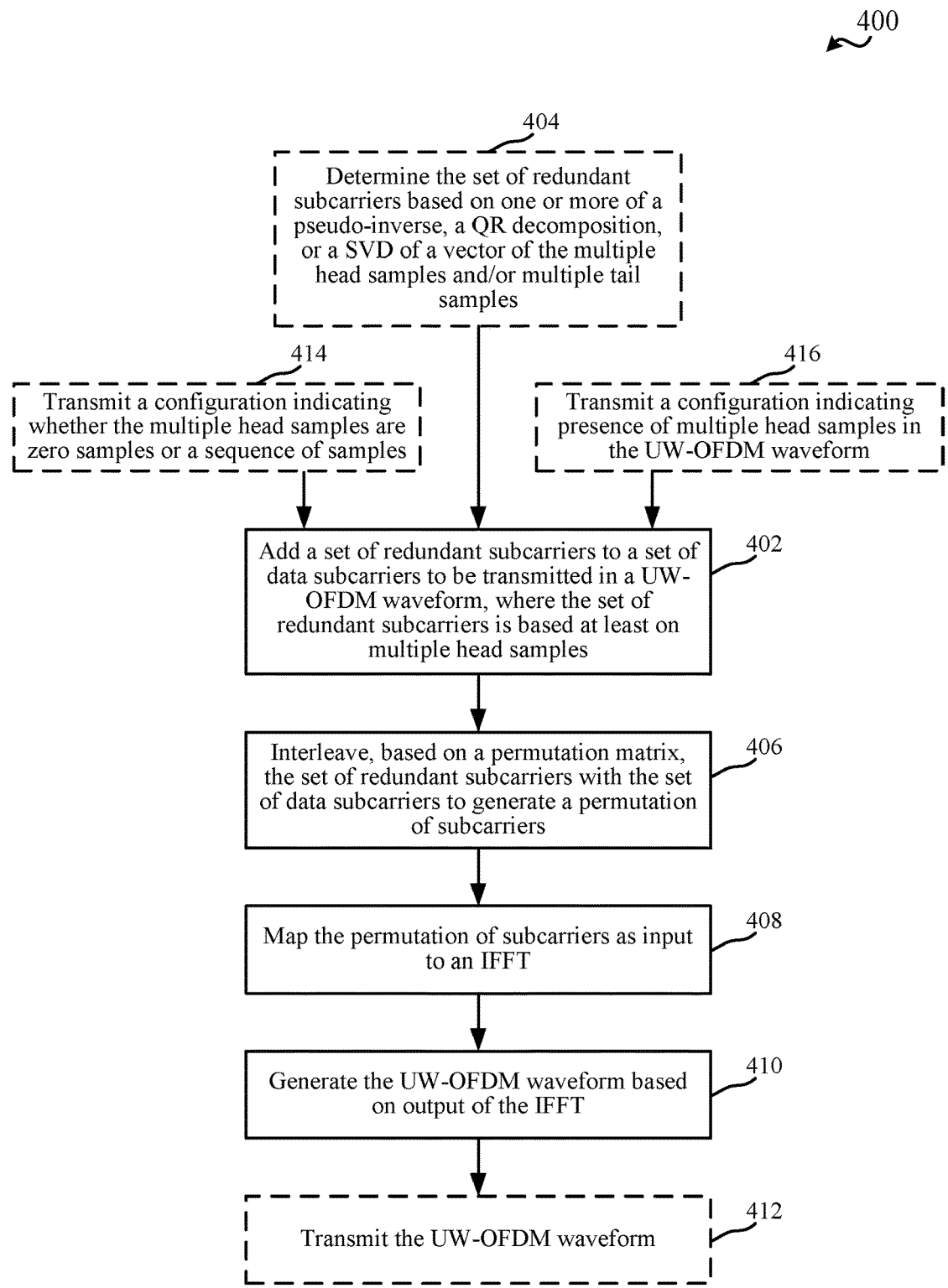
FIG. 4 is a flow chart illustrating an example of a method for generating a waveform with a set of redundant subcarriers, in accordance with aspects described herein.

FIG. 4 illustrates a flow chart of an example of a method 400 for generating a waveform with a set of redundant SCs, in accordance with aspects described herein. In an example, a base station 102 can perform the functions described in method 400 using one or more of the components described in FIGS. 1 and 3. In another example, a UE 104 can include the one or more components described of the base station 102 in FIGS. 1 and 3 to generate the waveform.

In method 400, at Block 402, a set of redundant subcarriers can be added to a set of data subcarriers to be transmitted in a UW-OFDM waveform, where the set of redundant subcarriers is based at least on multiple head samples. In an aspect, redundant SC component 352, e.g., in conjunction with processor(s) 312, memory 316, transceiver 302, BS communicating component 342, etc., can add a set of redundant subcarriers to a set of data subcarriers to be transmitted in a UW-OFDM waveform, where the set of redundant subcarriers is based at least on multiple head samples. For example, the multiple head samples can be added to the UW-OFDM waveform to provide additional separation between symbols. In one example, redundant SC component 352 can add redundant SCs for head and tail samples. An example is shown in FIG. 5.

Figure 5:
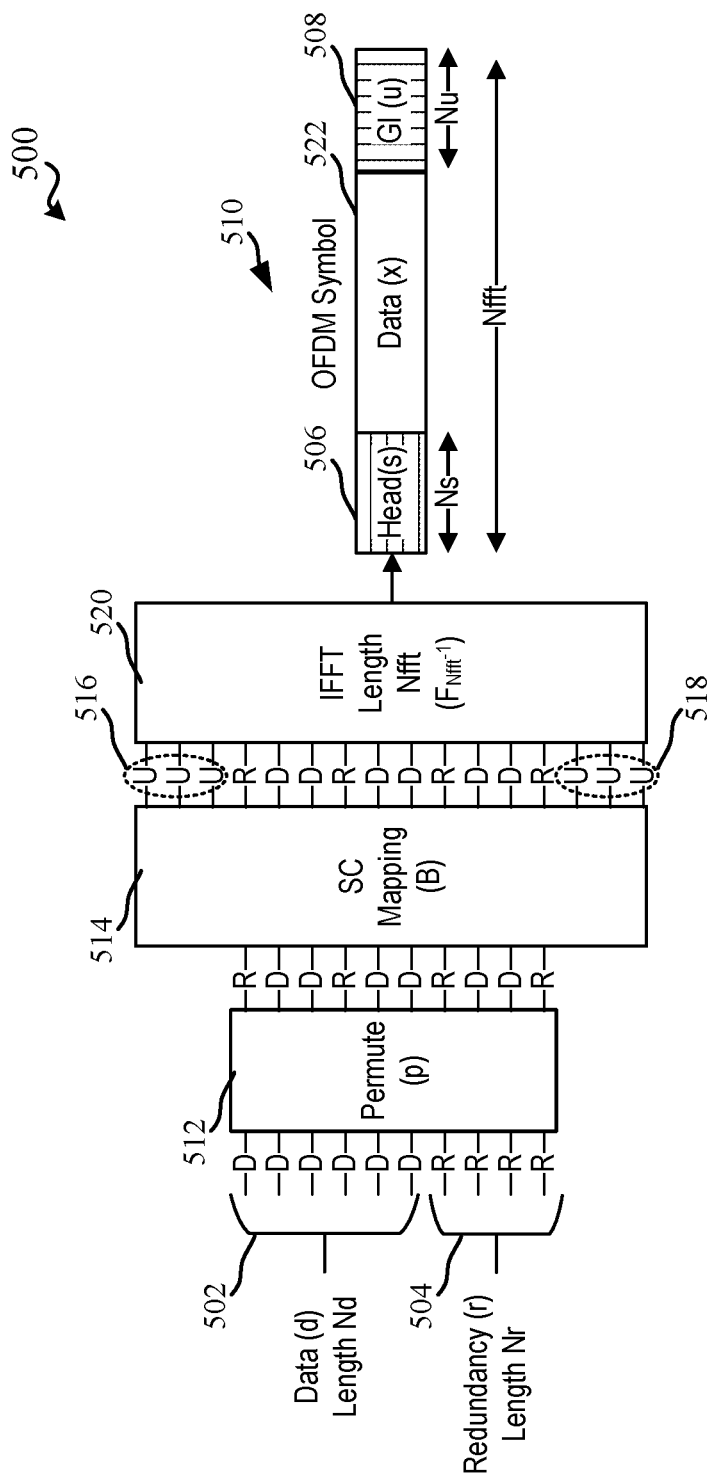
FIG. 5 illustrates an example of a waveform generation process, in accordance with aspects described herein.

FIG. 5 illustrates an example of a waveform generation process 500 where data can be mapped to data subcarriers 502 over a frequency domain, and a set of redundant subcarriers 504 can be added to effectuate one or more of head samples 506 or tail samples 508 added to the resulting waveform 510. Redundant SC component 352 can select the set of redundant subcarriers 504 to include based on a desired set of head samples or tail samples (e.g., a number of zeros or unique word head samples and/or a number of zeros or unique word tail samples).

As described above, data samples (x) and GI samples (u) can be determined based on performing IFFT of the data SCs (d) and redundant SCs (r) having a SC mapping (B) and permutation matrix (P) applied. To add GI head samples (s) in addition to the GI tail samples (u), the operation can be represented as:

$$\begin{bmatrix} s \\ x \\ u \end{bmatrix} = M \begin{bmatrix} d \\ r \end{bmatrix}, \text{ where } M = F_N^{-1} BP$$

where s is the head samples of length N.

$$\begin{bmatrix} s \\ x \\ u \end{bmatrix} = \begin{bmatrix} M_{11} & M_{12} \\ M_{21} & M_{22} \\ M_{31} & M_{32} \end{bmatrix} \begin{bmatrix} d \\ r \end{bmatrix} \rightarrow \begin{bmatrix} s \\ u \end{bmatrix} = \begin{bmatrix} M_{11} & M_{12} \\ M_{21} & M_{22} \end{bmatrix} \begin{bmatrix} d \\ r \end{bmatrix}$$

In an example, $$\hat{r} = \begin{bmatrix} M_{12} \\ M_{32} \end{bmatrix}^+ \left( \begin{bmatrix} s \\ u \end{bmatrix} - \begin{bmatrix} M_{11} \\ M_{31} \end{bmatrix} d \right), \text{ where } \begin{bmatrix} M_{12} \\ M_{32} \end{bmatrix}^+$$

is the pseudo-inverse of $$\begin{bmatrix} M_{12} \\ M_{32} \end{bmatrix}.$$

As such, for example, r̂ can be a function of s, d, and u.

In an example, redundant SC component 352 can determine the set of redundant subcarriers to add, r̂, and/or the permutation matrix for interleaving the redundant subcarriers with the data subcarriers, based on this formula. In another example, redundant SC component 352 can determine the set of redundant subcarriers to add, r̂, and/or can determine the permutation matrix, P, for interleaving the redundant subcarriers with the data subcarriers, using one or more of QR factorization, singular value decomposition (SVD), etc. For example, in method 400, optionally at Block 404, the set of redundant subcarriers can be determined based on one or more of a pseudo-inverse, a QR decomposition, or a SVD of a vector of the multiple head samples and/or multiple tail samples. In an aspect, redundant SC component 352, e.g., in conjunction with processor(s) 312, memory 316, transceiver 302, BS communicating component 342, etc., can determine the set of redundant subcarrier based on one or more of a pseudo-inverse, a QR decomposition, or a SVD of a vector of the multiple head samples and/or multiple tail samples.

In method 400, at Block 406, the set of redundant subcarriers can be interleaved, based on a permutation matrix, with the set of data subcarriers to generate a permutation of subcarriers. In an aspect, interleaving component 354, e.g., in conjunction with processor(s) 312, memory 316, transceiver 302, BS communicating component 342, etc., can interleave, based on a permutation matrix, the set of redundant subcarriers with the set of data subcarriers to generate the permutation of subcarriers. For example, interleaving component 354 can determine the permutation matrix that can be used to add the desired head samples and/or tail samples, as described above. In one example, interleaving component 354 can receive or obtain the permutation matrix, an indication of the permutation matrix, or an indication of one or more parameters for determining the permutation matrix, from a configuration stored in memory 316 or from one or more components of a core network, etc. In an example, configuring component 360 can transmit a configuration to the UE 104 that includes the permutation matrix, an indication of the permutation matrix, or an indication of one or more parameters for determining the permutation matrix (e.g., using semi-static signaling, such as radio resource control (RRC) signaling, dynamic signaling, such as using media access control (MAC)-control element (CE) or downlink control information (DCI), etc.) to allow the UE 104 to separate the permutation of subcarriers in received waveforms.

Referring again to FIG. 5, in an example, interleaving component 354 can permute the data subcarriers 502 and redundant subcarriers 504 using a permutation matrix at 512 to create a permutation of subcarriers. In one example, as shown, the permutation matrix can facilitate interleaving of the redundant subcarriers within the data subcarriers, which may be according to a pattern. Defining, via the permutation matrix, the placement of the redundant subcarriers within the permutation of subcarriers can impact the reliability of the waveform, and different strategies for the permutation matrix are described herein.

In method 400, at Block 408, the permutation of subcarriers can be mapped as input to an IFFT. In an aspect, mapping component 356, e.g., in conjunction with processor(s) 312, memory 316, transceiver 302, BS communicating component 342, etc., can map the permutation of subcarriers as input to the IFFT. In an example, mapping component 356 can map the permutation of subcarriers over a set of available frequency domain subcarriers assigned to, or otherwise designated for, the waveform, which can include a set of available subcarriers assigned for a channel over which the waveform is transmitted (e.g., a PDCCH, PDSCH, etc.). In addition, for example, mapping component 356 can map the permutation of subcarriers over the set of available subcarriers along with one or more sets of guard subcarriers as input to the IFFT, where the one or more sets of guard subcarriers may include a first set of guard subcarriers before the permutation of subcarriers and/or a second set of guard subcarriers following the permutation of subcarriers (in a frequency domain).

Referring again to FIG. 5, in an example, mapping component 356 can perform SC mapping at 514 to map a first set of guard subcarriers 516 and a second set of guard subcarriers 518 with the permutation of subcarriers. The result can be provided as input to the IFFT 520.

In method 400, at Block 410, the UW-OFDM waveform can be generated based on output of the IFFT. In an aspect, IFFT component 358, e.g., in conjunction with processor(s) 312, memory 316, transceiver 302, BS communicating component 342, etc., can perform the IFFT and generate the UW-OFDM waveform based on output of the IFFT. The UW-OFDM waveform, as described, can include, based on the redundant subcarriers, head samples, data samples, and tail samples. For example, IFFT component 358 can generate the head samples and/or tail samples to be zeros or to be based on some sequence (a unique word), as described.

Referring again to FIG. 5, in an example, the output of IFFT 520 can include the UW-OFDM waveform 510 including head samples 506, data samples 522 and tail samples 508.

In method 400, at Block 412, the UW-OFDM waveform can be transmitted. In an aspect, BS communicating component 342, e.g., in conjunction with processor(s) 312, memory 316, transceiver 302, etc., can transmit the UW-OFDM waveform (e.g., to a UE 104 or other devices using wireless communication). Transmitting the UW-OFDM waveform with the head samples can effectively shift the power emitted by the waveform for transmission to remove power regrowth at the end of the waveform that may result where no head samples of zero or unique word are used (e.g., where only tail samples of zero or unique word are used).

In method 400, optionally at Block 414, a configuration indicating whether the multiple head samples are zero samples or a sequence of samples can be transmitted. In an aspect, configuring component 360, e.g., in conjunction with processor(s) 312, memory 316, transceiver 302, BS communicating component 342, etc., can transmit (e.g., to a UE 104 or other device receiving the UW-OFDM waveform) the configuration indicating whether the multiple head samples are zero samples or a sequence of samples. For example, configuring component 360 can transmit the configuration using semi-static signaling (e.g., RRC signaling), or dynamic signaling (e.g., using MAC-CE, DCI, etc.). In an example, configuring component 360 can transmit the configuration to indicate switching from using zeros to unique word (or vice versa) for the head and/or tail samples a given period of time. In any case, this can allow the device identify the head and tail samples in the UW-OFDM waveform (based on detecting zeros or the unique sequence of samples).

In method 400, optionally at Block 416, a configuration indicating presence of multiple head samples in the UW-OFDM waveform can be transmitted. In an aspect, configuring component 360, e.g., in conjunction with processor(s) 312, memory 316, transceiver 302, BS communicating component 342, etc., can transmit (e.g., to a UE 104 or other device receiving the UW-OFDM waveform) the configuration indicating presence (or absence) of multiple head samples in the UW-OFDM waveform. In this regard, for example, configuring component 360 can activate or deactivate the head samples or tail samples in the UW-OFDM waveform. Moreover, for example, configuring component 360 can transmit the configuration using semi-static signaling, dynamic signaling, etc., as described.

In accordance with aspects described herein, redundant SC component 352 can add redundant SCs to the data SCs such to add head samples with or without adding tail samples. In an example, adding head samples can result in lower power regrowth at the end of the guard interval by effectively shifting power emitted by transmitting the waveform by introducing the head samples at the start of the waveform and shifting off some of the tail of the waveform, which may have otherwise included the power regrowth. Ridding of the power regrowth, in this regard, can result in better guard interval quality.

Figure 6:
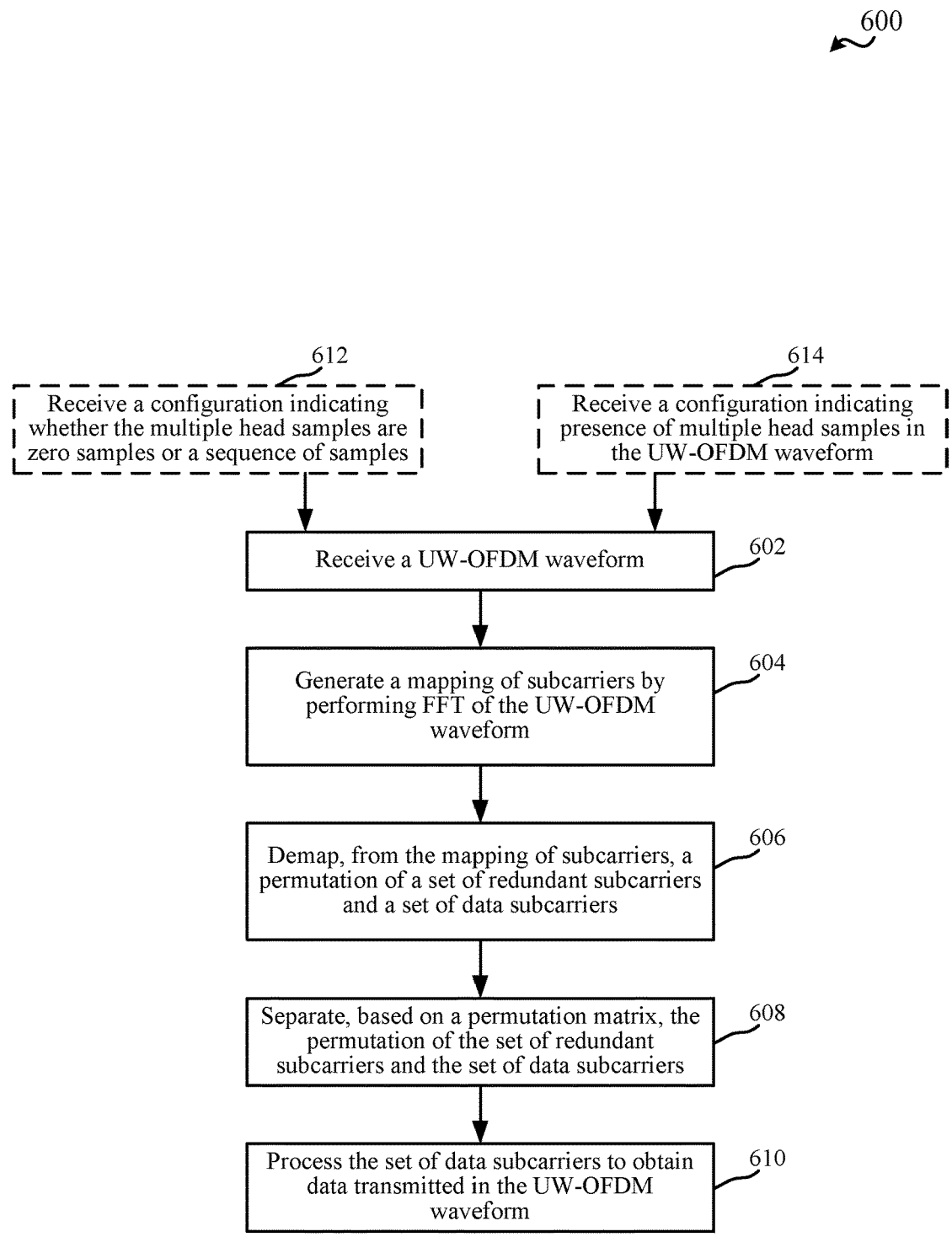
FIG. 6 is a flow chart illustrating an example of a method for processing a waveform with a set of redundant subcarriers, in accordance with aspects described herein.

FIG. 6 illustrates a flow chart of an example of a method 600 for processing a waveform with a set of redundant SCs, in accordance with aspects described herein. In an example, a UE 104 can perform the functions described in method 600 using one or more of the components described in FIGS. 1 and 2. In another example, a base station 102 can include the one or more components described of the UE 104 in FIGS. 1 and 2 to process the waveform.

In method 600, at Block 602, a UW-OFDM waveform can be received. In an aspect, UE communicating component 242, e.g., in conjunction with processor(s) 212, memory 216, transceiver 202, etc., can receive the UW-OFDM waveform (e.g., from a base station 102 or other UE 104). For example, UE communicating component 242 can receive the UW-OFDM waveform in time and frequency resources that are scheduled for receiving communications.

In method 600, at Block 604, a mapping of subcarriers can be generated by performing FFT of the UW-OFDM waveform. In an aspect, FFT component 252, e.g., in conjunction with processor(s) 212, memory 216, transceiver 202, UE communicating component 242, etc., can generate the mapping of subcarriers by performing FFT of the UW-OFDM waveform. For example, the mapping of subcarriers can relate to subcarriers in a frequency domain over which signal energy is received by the UW-OFDM waveform.

In method 600, at Block 606, a permutation of a set of redundant subcarriers and a set of data subcarriers can be demapped from the mapping of subcarriers. In an aspect, demapping component 254, e.g., in conjunction with processor(s) 212, memory 216, transceiver 202, UE communicating component 242, etc., can demap the permutation of the set of redundant subcarriers and the set of data subcarriers from other subcarriers in the UW-OFDM waveform, which may include one or more sets of guard subcarriers, as described above. In an example, demapping component 254 can receive (e.g., from the base station 102 or other device transmitting the UW-OFDM waveform) and indication of how to demap the subcarriers. For example, demapping component 254 can receive an indication of the SC mapping matrix B used by the base station 102 to map the SCs. For example, referring to FIG. 5, demapping component can demap the permutation of subcarriers from the first set of guard subcarriers 516 and the second set of guard subcarriers 518.

In method 600, at Block 608, the permutation of the set of redundant subcarriers and the set of data subcarriers can be separated based on a permutation matrix. In an aspect, separating component 256, e.g., in conjunction with processor(s) 212, memory 216, transceiver 202, UE communicating component 242, etc., can separate, based on the permutation matrix, the permutation of the set of redundant subcarriers and the set of data subcarriers. For example, the permutation matrix can be the same as (or an inverse of or otherwise generated from) the permutation used in generating the UW-OFDM waveform (e.g., by the interleaving component 354 of the transmitting node). Thus, in one example, separating component 256 can receive, from the base station 102 or other device transmitting the UW-OFDM waveform, an indication of the permutation matrix, P, or one or more parameters for determining the permutation matrix, used to arrange the permutation. In any case, with the data subcarriers and the redundant subcarriers separate, separating component 256 can obtain the data subcarriers for processing.

In method 600, at Block 610, the set of data subcarriers can be processed to obtain data transmitted in the UW-OFDM waveform. In an aspect, processing component 258, e.g., in conjunction with processor(s) 212, memory 216, transceiver 202, UE communicating component 242, etc., can process the set of data subcarriers to obtain data transmitted in the UW-OFDM waveform.

In method 600, optionally at Block 612, a configuration indicating whether the multiple head samples are zero samples or a sequence of samples can be received. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform) the configuration indicating whether the multiple head samples are zero samples or a sequence of samples. For example, configuration processing component 260 can receive the configuration using semi-static signaling or dynamic signaling, and may process the configuration to determine whether the received waveform uses zeros or unique word for the head and/or tail samples a given period of time.

In method 600, optionally at Block 614, a configuration indicating presence of multiple head samples in the UW-OFDM waveform can be received. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform) the configuration indicating presence (or absence) of multiple head samples in the UW-OFDM waveform. In this regard, for example, configuration processing component 260 can receive the configuration to determine whether to activate or deactivate the head samples or tail samples in processing received UW-OFDM waveforms. Moreover, for example, configuration processing component 260 can receive the configuration using semi-static signaling, dynamic signaling, etc., as described.

Figure 7:
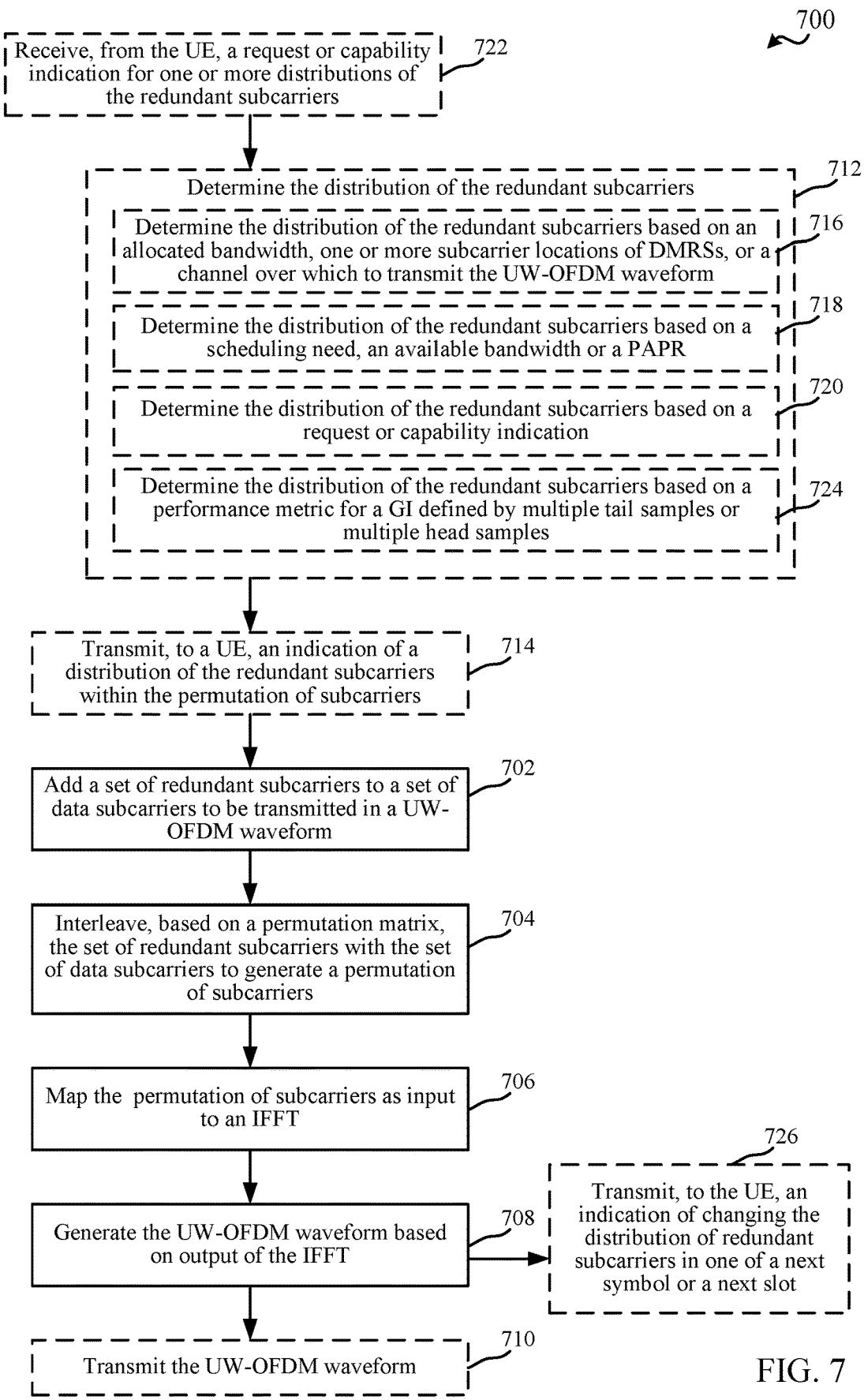
FIG. 7 is a flow chart illustrating an example of a method for generating a waveform with a distribution of redundant subcarriers, in accordance with aspects described herein.

FIG. 7 illustrates a flow chart of an example of a method 700 for generating a waveform with a distribution of redundant subcarriers, in accordance with aspects described herein. In an example, a base station 102 can perform the functions described in method 700 using one or more of the components described in FIGS. 1 and 3. In another example, a UE 104 can include the one or more components described of the base station 102 in FIGS. 1 and 3 to generate the waveform.

In method 700, at Block 702, a set of redundant subcarriers can be added to a set of data subcarriers to be transmitted in a UW-OFDM waveform. In an aspect, redundant SC component 352, e.g., in conjunction with processor(s) 312, memory 316, transceiver 302, BS communicating component 342, etc., can add a set of redundant subcarriers to a set of data subcarriers to be transmitted in a UW-OFDM waveform. As described, for example, the redundant subcarriers added to the waveform can be used to achieve a number of head and/or tail samples for the waveform In method 700, at Block 704, the set of redundant subcarriers can be interleaved, based on a permutation matrix, with the set of data subcarriers to generate a permutation of subcarriers. In an aspect, interleaving component 354, e.g., in conjunction with processor(s) 312, memory 316, transceiver 302, BS communicating component 342, etc., can interleave, based on a permutation matrix, the set of redundant subcarriers with the set of data subcarriers to generate the permutation of subcarriers. For example, interleaving component 354 can determine the permutation matrix that can be used to add the desired head samples and/or tail samples, as described above. This may be based on, or using, the formulas described above, in one example. As described, interleaving component 354 can obtain, from memory 316 or core network component, the permutation matrix, an indication of the permutation matrix, or an indication of one or more parameters for determining the permutation matrix, and/or may configure the UE 104 with the permutation matrix, an indication of the permutation matrix, or an indication of one or more parameters for determining the permutation matrix.

In method 700, at Block 706, the permutation of subcarriers can be mapped as input to an IFFT. In an aspect, mapping component 356, e.g., in conjunction with processor(s) 312, memory 316, transceiver 302, BS communicating component 342, etc., can map the permutation of subcarriers as input to the IFFT. In an example, mapping component 356 can map the permutation of subcarriers over a set of available frequency domain subcarriers assigned to, or otherwise designated for, the waveform, which can include a set of available subcarriers assigned for a channel over which the waveform is transmitted (e.g., a PDCCH, PDSCH, etc.). In addition, for example, mapping component 356 can map the permutation of subcarriers over the set of available subcarriers along with one or more sets of guard subcarriers as input to the IFFT, where the one or more sets of guard subcarriers may include a first set of guard subcarriers before the permutation of subcarriers and/or a second set of guard subcarriers following the permutation of subcarriers (in a frequency domain).

In method 700, at Block 708, the UW-OFDM waveform can be generated based on output of the IFFT. In an aspect, IFFT component 358, e.g., in conjunction with processor(s) 312, memory 316, transceiver 302, BS communicating component 342, etc., can perform the IFFT and generate the UW-OFDM waveform based on output of the IFFT. The UW-OFDM waveform, as described, can include, based on the redundant subcarriers, head samples, data samples, and tail samples. For example, IFFT component 358 can generate the head samples and/or tail samples to be zeros or to be based on some sequence (a unique word), as described.

In method 700, at Block 710, the UW-OFDM waveform can be transmitted. In an aspect, BS communicating component 342, e.g., in conjunction with processor(s) 312, memory 316, transceiver 302, etc., can transmit the UW-OFDM waveform (e.g., to a UE 104 or other devices using wireless communication). In this example, the redundant subcarriers can be distributed using one or more strategies to achieve a level of reliability for the waveform, as described herein. For example, the quality of the UW samples (e.g., how close are they to the intended values), can depend on the solution for the equation r. When trying to solve for the redundant subcarriers, the following matrices can be of interest $A = M_{22}$ when trying to solve for tail GI only $$A = \begin{bmatrix} M_{12} \\ M_{32} \end{bmatrix}$$

when trying to solve for head and tail GI.

In an example, $N_r$ may be chosen to be less than $N_u$, hence A may have more rows that columns and solving for r can become a least square fitting problem. In this example, the quality of the UW samples can depend on how good is the fit (e.g., how small is the error). In an example, the projection error (the least square problem) can then be written as:

For tail GI only: $e = (M_{21}d + M_{22}\hat{r}) - u$ $$e = \left( \begin{bmatrix} M_{11} \\ M_{31} \end{bmatrix} d + \begin{bmatrix} M_{12} \\ M_{32} \end{bmatrix} \hat{r} \right) - \begin{bmatrix} s \\ u \end{bmatrix}$$

For head and tail GI:

For example, a set of available subcarriers for defining the redundant subcarriers can be defined to equal or be less than the set of all available subcarriers for the waveform. As described, using more subcarriers for defining redundant subcarriers can provide for better quality GI, smaller projection error, and better PAPR, but may also have more associated overhead. Thus, in an example, the available subcarriers for defining the redundant subcarriers and/or the distribution of redundant subcarriers within can be defined to balance the GI quality with overhead.

In method 700, optionally at Block 712, a distribution of the redundant subcarriers can be determined. In an aspect, redundant SC component 352, e.g., in conjunction with processor(s) 312, memory 316, transceiver 302, BS communicating component 342, etc., can determine the distribution of the redundant subcarriers. In one example, redundant SC component 352 can determine a number of redundant subcarriers and/or the placement of the redundant subcarriers within a set of available subcarriers for the waveform, or a more limited set of available subcarriers over which redundant subcarriers may be placed within the set of available subcarriers for the waveform. For example, determining the distribution of the redundant subcarriers can include determining a position or index in frequency for the redundant subcarriers to achieve head and/or tail samples for the UW-OFDM waveform. In some examples, redundant SC component 352 can determine the distribution of the redundant subcarriers based on scheduling need for the UE, available bandwidth for allocation resources to the UE, desired PAPR, etc. In addition, for example, redundant SC component 352 can determine the distribution of the redundant subcarriers based on request or recommendation of the UE, a defined UE capability related to the redundant subcarriers or more generally as related to supported bandwidth, etc. In other examples, redundant SC component 352 can determine the distribution of the redundant subcarriers implicitly based on one or more rules or parameters, performance requirements for the GI, etc. Moreover, in an example, redundant SC component 352 can determine the distribution of redundant subcarriers per symbol or based on a symbol (e.g., based on an index of the symbol within a slot) or per slot (e.g., based on an index of the slot within a collection of slots), which may be based on a defined pattern of distributions over multiple symbols or slots.

In one example, redundant SC component 352 can determine the distribution of the redundant subcarriers based on determining a change in bandwidth available for distributing the redundant subcarriers. For example, given a bandwidth allocation of subcarriers for the waveform, a portion of subcarriers within the bandwidth allocation can be specified for distributing the redundant subcarriers, and the redundant subcarriers may be distributed over the portion of subcarriers. In a specific example, given an available bandwidth (e.g., subcarriers available for the IFFT) of 4096, a portion of the 4096 subcarriers can be indicated for distribution of redundant subcarriers, such as all 4096 subcarrier or a fraction there of (e.g., 3300 subcarriers, 600 subcarriers, etc.). A number of redundant subcarriers (e.g., 288) can be distributed in the portion of subcarriers as indicated. In an example, redundant SC component 352 can determine the distribution of redundant subcarriers based on a change in the number of subcarriers available for the redundancy, which may depend on allocation of bandwidth for the UE or a maximum bandwidth defined for the UE, etc.

In another example, redundant SC component 352 can determine the distribution of the redundant subcarriers based on a shift in the redundant subcarriers within the allocation. For example, the shift can be defined to accommodate for (e.g., not interfere with) demodulation reference signals (DMRSs) or other signals/channels within the available bandwidth. Thus, given a position of DMRSs or other signals/channels within the available bandwidth, redundant SC component 352 can determine an amount of subcarriers by which to shift the redundant subcarriers, in frequency, such to avoid colliding with subcarriers carrying DMRSs or other signals/channels. In yet another example, redundant SC component 352 can determine the distribution of the redundant subcarriers based on a shift in the redundant subcarriers outside of the allocation. For example, the shift can be defined to accommodate for (e.g., not interfere with) or other signals/channels within the available bandwidth. Thus, given a position of other signals/channels within the available bandwidth, redundant SC component 352 can determine the shift to shift the distribution of redundant subcarriers, in frequency, at least partially outside of the allocated bandwidth.

In method 700, optionally at Block 714, an indication of a distribution of the redundant subcarriers within the permutation of subcarriers can be transmitted to a UE. In an aspect, redundant SC component 352, e.g., in conjunction with processor(s) 312, memory 316, transceiver 302, BS communicating component 342, etc., can transmit, to the UE (or other device receiving the UW-OFDM), the indication of the distribution of the redundant subcarriers within the permutation of subcarriers. For example, redundant SC component 352 can transmit the indication using semi-static signaling, dynamic signaling, etc., and the indication can specify a new distribution, a modification to a previous distribution, etc. For example, the indication may indicate a pattern of distribution, a number of redundant subcarriers, a fraction of bandwidth over which redundant subcarriers are distributed, a permutation matrix being used, etc. In any case, the UE can determine the distribution of redundant subcarriers based on the indication in processing the received waveform, as described above and further herein.

In one example, in determining the distribution of the redundant subcarriers at Block 712, optionally at Block 716, the distribution of redundant subcarriers can be determined based on an allocated bandwidth, one or more subcarrier locations of DMRSs, or a channel over which to transmit the UW-OFDM waveform. In an aspect, redundant SC component 352, e.g., in conjunction with processor(s) 312, memory 316, transceiver 302, BS communicating component 342, etc., can determine the distribution of redundant subcarriers based on the allocated bandwidth, one or more subcarrier locations of DMRSs, or the channel over which to transmit the UW-OFDM waveform. For example, redundant SC component 352 can determine the distribution of redundant subcarriers over all of an allocated bandwidth, a fraction of available bandwidth, etc. In another example, redundant SC component 352 can determine the distribution of redundant subcarriers to avoid SC locations defined for DMRS. In yet another example, redundant SC component 352 can determine the distribution of redundant subcarriers to be different for different types of channels (e.g., PDCCH may distribute the redundant subcarriers over a larger portion of the available bandwidth, as compared to PDSCH, to improve reliability of PDCCH).

In one example, in determining the distribution of the redundant subcarriers at Block 712, optionally at Block 718, the distribution of redundant subcarriers can be determined based on a scheduling need, an available bandwidth, or a PAPR. In an aspect, redundant SC component 352, e.g., in conjunction with processor(s) 312, memory 316, transceiver 302, BS communicating component 342, etc., can determine the distribution of the redundant subcarriers based on a scheduling need, an available bandwidth, or a PAPR. For example, scheduling need can relate to scheduling need at the base station 102 for multiple UEs, and redundant SC component 352 can determine the distribution of redundant subcarriers to account for the scheduling need (e.g., use less redundant subcarriers where scheduling need is high). In another example, available bandwidth can relate to bandwidth available at the base station 102, and redundant SC component 352 can determine the distribution of redundant subcarriers to account for the available bandwidth (e.g., use less redundant subcarriers where available bandwidth is low). In yet another example, PAPR can relate to PAPR at the base station 102, and redundant SC component 352 can determine the distribution of redundant subcarriers to account for the PAPR (e.g., use more redundant subcarriers where PAPR is low).

In one example, in determining the distribution of the redundant subcarriers at Block 712, optionally at Block 720, the distribution of redundant subcarriers can be determined based on a request or capability indication. In an aspect, redundant SC component 352, e.g., in conjunction with processor(s) 312, memory 316, transceiver 302, BS communicating component 342, etc., can determine the distribution of the redundant subcarriers based on the request or capability indication. For example, optionally at Block 722, a request or capability indication for one or more distributions of redundant subcarriers can be received from the UE. In an aspect, redundant SC component 352, e.g., in conjunction with processor(s) 312, memory 316, transceiver 302, BS communicating component 342, etc., can receive, from the UE, the request or capability indication for one or more distributions of the redundant subcarriers. For example, redundant SC component 352 can receive the request or capability indication from the UE in semi-static signaling, dynamic signaling (e.g., uplink control information), etc. In an example, the request or capability indication can specify a pattern of distribution, a number of redundant subcarriers supported for distribution, a number or fraction of available subcarriers over which distribution of redundant subcarriers is supported by the UE, one or more specific permutation matrices supported by the UE, etc.

In one example, in determining the distribution of the redundant subcarriers at Block 712, optionally at Block 724, the distribution of redundant subcarriers can be determined based on a performance metric for a GI defined by multiple tail samples or multiple head samples. In an aspect, redundant SC component 352, e.g., in conjunction with processor(s) 312, memory 316, transceiver 302, BS communicating component 342, etc., can determine the distribution of redundant subcarriers based on a performance metric for a GI defined by multiple tail samples or multiple head samples. For example, to achieve the performance metric for the GI, the distribution of redundant subcarriers may be selected, such as the number of redundant subcarriers, the placement of subcarriers within the available bandwidth, etc.

In method 700, optionally at Block 726, an indication of changing the distribution of redundant subcarriers in one of a next symbol or a next slot can be transmitted to the UE. In an aspect, redundant SC component 352, e.g., in conjunction with processor(s) 312, memory 316, transceiver 302, BS communicating component 342, etc., can transmit, to the UE, the indication of changing the distribution of redundant subcarriers in one of the next symbol or the next slot. In one example, the indication can be transmitted per symbol or slot. In another example, as described, the indication can correspond to a pattern of distributions among symbol or slots. In any case, redundant SC component 352 can add and interleave the redundant SCs to comply with the indication.

Figure 8:
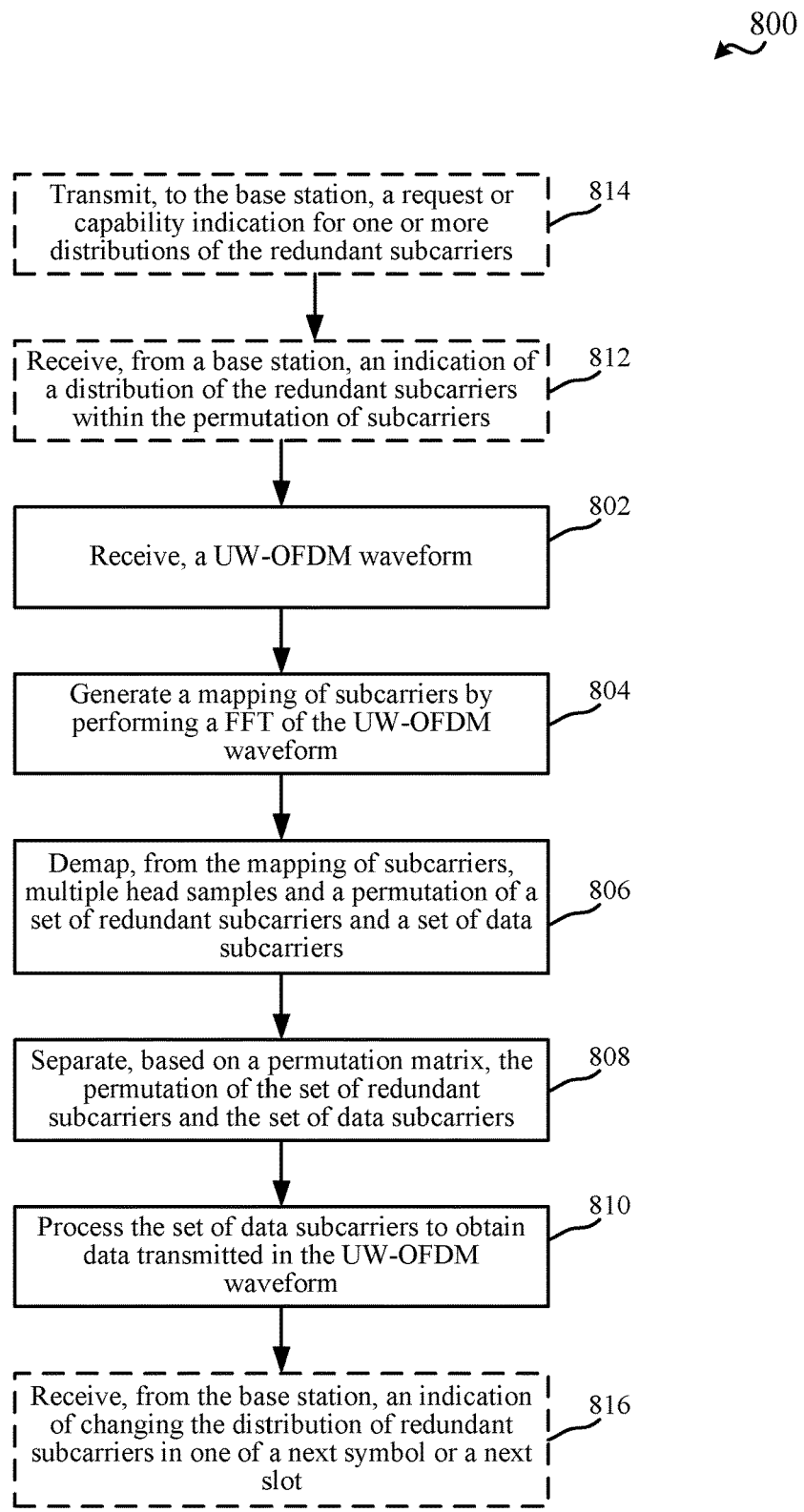
FIG. 8 is a flow chart illustrating an example of a method for processing a waveform based on a distribution of redundant subcarriers, in accordance with aspects described herein.

FIG. 8 illustrates a flow chart of an example of a method 800 for processing a waveform based on a distribution of redundant subcarriers, in accordance with aspects described herein. In an example, a UE 104 can perform the functions described in method 800 using one or more of the components described in FIGS. 1 and 2. In another example, a base station 102 can include the one or more components described of the UE 104 in FIGS. 1 and 2 to process the waveform.

In method 800, at Block 802, a UW-OFDM waveform can be received. In an aspect, UE communicating component 242, e.g., in conjunction with processor(s) 212, memory 216, transceiver 202, etc., can receive the UW-OFDM waveform (e.g., from a base station 102 or other UE 104). For example, UE communicating component 242 can receive the UW-OFDM waveform in time and frequency resources that are scheduled for receiving communications.

In method 800, at Block 804, a mapping of subcarriers can be generated by performing FFT of the UW-OFDM waveform. In an aspect, FFT component 252, e.g., in conjunction with processor(s) 212, memory 216, transceiver 202, UE communicating component 242, etc., can generate the mapping of subcarriers by performing FFT of the UW-OFDM waveform. For example, the mapping of subcarriers can relate to subcarriers in a frequency domain over which signal energy is received by the UW-OFDM waveform.

In method 800, at Block 806, a permutation of a set of redundant subcarriers and a set of data subcarriers can be demapped from the mapping of subcarriers. In an aspect, demapping component 254, e.g., in conjunction with processor(s) 212, memory 216, transceiver 202, UE communicating component 242, etc., can demap the permutation of the set of redundant subcarriers and the set of data subcarriers from other subcarriers in the UW-OFDM waveform, which may include one or more sets of guard subcarriers, as described above. In an example, demapping component 254 can receive (e.g., from the base station 102 or other device transmitting the UW-OFDM waveform) and indication of how to demap the subcarriers. For example, demapping component 254 can receive an indication of the SC mapping matrix B used by the base station 102 to map the SCs. For example, referring to FIG. 5, demapping component can demap the permutation of subcarriers from the first set of guard subcarriers 516 and the second set of guard subcarriers 518.

In method 800, at Block 808, the permutation of the set of redundant subcarriers and the set of data subcarriers can be separated based on a permutation matrix. In an aspect, separating component 256, e.g., in conjunction with processor(s) 212, memory 216, transceiver 202, UE communicating component 242, etc., can separate, based on the permutation matrix, the permutation of the set of redundant subcarriers and the set of data subcarriers. For example, the permutation matrix can be the same as (or an inverse of or otherwise generated from) the permutation used in generating the UW-OFDM waveform (e.g., by the interleaving component 354 of the transmitting node). Thus, in one example, separating component 256 can receive, from the base station 102 or other device transmitting the UW-OFDM waveform, an indication of the permutation matrix, P, used to arrange the permutation. In any case, with the data subcarriers and the redundant subcarriers separate, separating component 256 can obtain the data subcarriers for processing.

In method 800, at Block 810, the set of data subcarriers can be processed to obtain data transmitted in the UW-OFDM waveform. In an aspect, processing component 258, e.g., in conjunction with processor(s) 212, memory 216, transceiver 202, UE communicating component 242, etc., can process the set of data subcarriers to obtain data transmitted in the UW-OFDM waveform.

In method 800, optionally at Block 812, an indication of a distribution of the redundant subcarriers within the permutation of subcarriers can be received. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform) the indication of the distribution of redundant subcarriers within the permutation of subcarriers. For example, configuration processing component 260 can receive the indication, and separating component 256 can separate the redundant subcarriers from the data subcarriers based on the indication. As described, for example, configuration processing component 260 can receive the indication in semi-static signaling, dynamic signaling, etc. Moreover, as described, the indication can indicate one or more parameters for determining the distribution of redundant subcarriers, such as an amount of bandwidth over which the redundant subcarriers are distributed, a number of distributed redundant subcarriers, placement of the redundant subcarriers within the bandwidth, the permutation matrix used to arrange the permutation of subcarriers, etc. In any case, separating component 256 can use this information to separate the data subcarriers from the redundant subcarriers.

As described, in one example, the distribution of redundant subcarriers can be based on a capability or request of the UE. Thus, in an example, optionally at Block 814, a request or capability indication for one or more distributions of the redundant subcarriers can be transmitted to the base station. In an aspect, separating component 256, e.g., in conjunction with processor(s) 212, memory 216, transceiver 202, UE communicating component 242, etc., can transmit, to the base station, the request or capability indication for one or more distributions of the redundant subcarriers. For example, the request or capability indication can specify a pattern of distribution, a number of redundant subcarriers supported for distribution, a number or fraction of available subcarriers over which distribution of redundant subcarriers is supported by the UE, one or more specific permutation matrices supported by the UE, etc.

In method 800, optionally at Block 816, an indication of changing the distribution of redundant subcarriers in one of a next symbol or a next slot can be received from the base station. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform) the indication of changing the distribution of redundant subcarriers in one of the next symbol or the next slot. In one example, the indication can be received per symbol or slot. In another example, as described, the indication can correspond to a pattern of distributions among symbol or slots. In any case, separating component 256 can separate the data subcarriers from the redundant subcarriers per symbol or per slot based on the indication.

Figure 9:
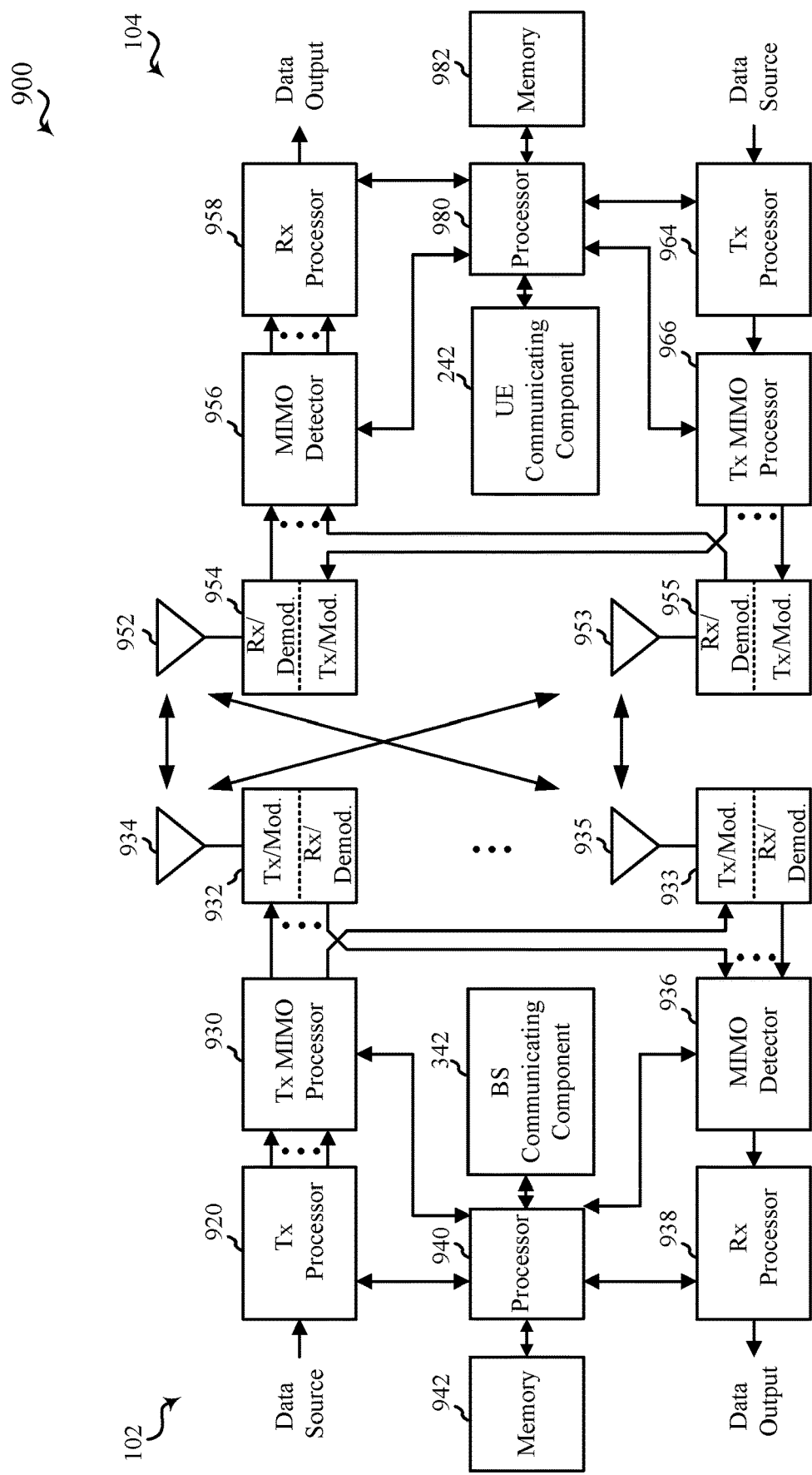
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communications including adding a set of redundant subcarriers to a set of data subcarriers to be transmitted in a UW-OFDM waveform, wherein the set of redundant subcarriers is based at least on multiple head samples to be included in the UW-OFDM waveform, interleaving, based on a permutation matrix, the set of redundant subcarriers with the set of data subcarriers to generate a permutation of subcarriers, mapping the permutation of subcarriers as input to an IFFT, and generating the UW-OFDM waveform based on output of the IFFT.

In Aspect 2, the method of Aspect 1 include where the set of redundant subcarriers is further based on multiple tail samples to be included in the UW-OFDM waveform.

In Aspect 3, the method of Aspect 2 includes determining the set of redundant subcarriers based on one or more of a pseudo-inverse, a QR decomposition, or a SVD of a vector of the multiple head samples and the multiple tail samples.

In Aspect 4, the method of any of Aspects 1 to 3 includes where the multiple head samples are one of zero samples or a sequence of samples.

In Aspect 5, the method of Aspect 4 includes transmitting a configuration indicating whether the multiple head samples are the zero samples or the sequence of samples.

In Aspect 6, the method of any of Aspects 1 to 5 includes transmitting a configuration indicating presence of the multiple head samples in the UW-OFDM waveform.

In Aspect 7, the method of any of Aspects 1 to 6 includes transmitting, to a UE, an indication of a distribution of the redundant subcarriers within the permutation of subcarriers.

In Aspect 8, the method of Aspect 7 includes determining the distribution of the redundant subcarriers based on a scheduling need of the UE, an amount of available bandwidth, or a PAPR.

In Aspect 9, the method of any of Aspects 7 or 8 includes receiving, from the UE, a request for a certain distribution of the redundant subcarriers, and determining the distribution of the redundant subcarriers based on the request.

In Aspect 10, the method of any of Aspects 7 to 9 includes receiving, from the UE, a capability indication of one or more distributions of the redundant subcarriers, and determining the distribution of the redundant subcarriers based on the capability indication.

In Aspect 11, the method of any of Aspects 7 to 10 includes determining the distribution of the redundant subcarriers based on one or more of an allocated bandwidth, one or more subcarrier locations of demodulation reference signals, or a channel over which to transmit the UW-OFDM waveform.

In Aspect 12, the method of any of Aspects 7 to 11 includes determining the distribution of the redundant subcarriers based on a performance metric for a guard interval defined by one or more of multiple tail samples or multiple head samples.

In Aspect 13, the method of any of Aspects 7 to 12 includes where the distribution of the redundant subcarriers corresponds to one of a symbol or a slot.

In Aspect 14, the method of Aspect 13 includes transmitting, to the UE, an indication of changing the distribution of redundant subcarriers in one of a next symbol or a next slot.

In Aspect 15, the method of Aspect 14 includes where changing the distribution of the redundant subcarriers includes changing a bandwidth used for the distribution of the redundant subcarriers.

In Aspect 16, the method of any of Aspects 14 or 15 includes where changing the distribution of the redundant subcarriers includes shifting subcarriers within a bandwidth that are used for the distribution of the redundant subcarriers.

In Aspect 17, the method of any of Aspects 14 to 16 includes where changing the distribution of the redundant subcarriers includes shifting subcarriers outside of a bandwidth used for the distribution of the redundant subcarriers.

Aspect 18 is a method for wireless communications including receiving a UW-OFDM waveform, generating a mapping of subcarriers by performing a FFT of the UW-OFDM waveform, demapping, from the mapping of subcarriers, a permutation of a set of redundant subcarriers and a set of data subcarriers, wherein the set of redundant subcarriers is based at least on multiple head samples included in the UW-OFDM waveform, separating, based on a permutation matrix, the permutation of the set of redundant subcarriers and the set of data subcarriers, and processing the set of data subcarriers to obtain data transmitted in the UW-OFDM waveform.

In Aspect 19, the method of Aspect 18 includes where the set of redundant subcarriers is further based on multiple tail samples included in the UW-OFDM waveform.

In Aspect 20, the method of any of Aspects 18 or 19 includes where the multiple head samples are one of zero samples or a sequence of samples.

In Aspect 21, the method of Aspect 20 includes receiving a configuration indicating whether the multiple head samples are the zero samples or the sequence of samples.

In Aspect 22, the method of any of Aspects 18 to 21 includes receiving a configuration indicating presence of the multiple head samples in the UW-OFDM waveform, wherein demapping the multiple head samples is based on receiving the configuration.

In Aspect 23, the method of any of Aspects 18 to 22 includes receiving, from a base station, an indication of a distribution of the redundant subcarriers within the permutation of subcarriers, wherein separating the permutation of the set of redundant subcarriers and the set of data subcarriers is based on the indication of the distribution.

In Aspect 24, the method of Aspect 23 includes transmitting, to the base station, a request for a certain distribution of the redundant subcarriers.

In Aspect 25, the method of any of Aspects 23 or 24 includes transmitting, to the base station, a capability indication of one or more distributions of the redundant subcarriers.

In Aspect 26, the method of any of Aspects 23 to 25 includes where the distribution of the redundant subcarriers corresponds to one of a symbol or a slot.

In Aspect 27, the method of Aspect 26 includes receiving, from the base station, an indication of changing the distribution of redundant subcarriers in one of a next symbol or a next slot.

In Aspect 28, the method of Aspect 27 includes where changing the distribution of the redundant subcarriers includes changing a bandwidth used for the distribution of the redundant subcarriers.

In Aspect 29, the method of any of Aspects 27 or 28 includes where changing the distribution of the redundant subcarriers includes shifting subcarriers within a bandwidth that are used for the distribution of the redundant subcarriers.

In Aspect 30, the method of any of Aspects 27 to 29 includes where changing the distribution of the redundant subcarriers includes shifting subcarriers outside of a bandwidth used for the distribution of the redundant subcarriers.

Aspect 31 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 30.

Aspect 32 is an apparatus for wireless communication including means for performing any of the methods of Aspects 1 to 30.

Aspect 33 is a computer-readable medium including code executable by one or more processors for wireless communications, the code including code for performing any of the methods of Aspects 1 to 30.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions;
one or more processors communicatively coupled with the memory and the transceiver, wherein the one or more processors are configured to:
add a set of redundant subcarriers to a set of data subcarriers to be transmitted in a unique-word orthogonal frequency division multiplexing (UW-OFDM) waveform, wherein the set of redundant subcarriers is based at least on multiple head samples and multiple tail samples to be included in the UW-OFDM waveform;
interleave, based on a permutation matrix, the set of redundant subcarriers with the set of data subcarriers to generate a permutation of subcarriers;
map the permutation of subcarriers as input to an inverse fast Fourier transform (IFFT); and
generate the UW-OFDM waveform based on output of the IFFT.

2. The apparatus of claim 1, wherein the one or more processors are further configured to determine the set of redundant subcarriers based on one or more of a pseudo-inverse, a QR decomposition, or a singular value decomposition (SVD) of a vector of the multiple head samples and the multiple tail samples.

3. The apparatus of claim 1, wherein the multiple head samples are one of zero samples or a sequence of samples.

4. The apparatus of claim 3, wherein the one or more processors are further configured to transmit a configuration indicating whether the multiple head samples are the zero samples or the sequence of samples.

5. The apparatus of claim 1, wherein the one or more processors are further configured to transmit a configuration indicating presence of the multiple head samples in the UW-OFDM waveform.

6. The apparatus of claim 1, wherein the one or more processors are further configured to transmit, to a user equipment (UE), an indication of a distribution of the set of redundant subcarriers within the permutation of subcarriers.

7. The apparatus of claim 6, wherein the one or more processors are further configured to determine the distribution of the set of redundant subcarriers based on a scheduling need of the UE, an amount of available bandwidth, or a peak-to-average power ratio (PAPR).

8. The apparatus of claim 6, wherein the one or more processors are further configured to:
receive, from the UE, a request for a certain distribution of the set of redundant subcarriers; and
determine the distribution of the set of redundant subcarriers based on the request.

9. The apparatus of claim 6, wherein the one or more processors are further configured to:
receive, from the UE, a capability indication of one or more distributions of the set of redundant subcarriers; and
determine the distribution of the set of redundant subcarriers based on the capability indication.

10. The apparatus of claim 6, wherein the one or more processors are further configured to determine the distribution of the set of redundant subcarriers based on one or more of an allocated bandwidth, one or more subcarrier locations of demodulation reference signals, or a channel over which to transmit the UW-OFDM waveform.

11. The apparatus of claim 6, wherein the one or more processors are further configured to determine the distribution of the set of redundant subcarriers based on a performance metric for a guard interval defined by one or more of multiple tail samples or multiple head samples.

12. The apparatus of claim 6, wherein the distribution of the set of redundant subcarriers corresponds to one of a symbol or a slot.

13. The apparatus of claim 12, wherein the one or more processors are further configured to transmit, to the UE, an indication of changing the distribution of redundant subcarriers in one of a next symbol or a next slot.

14. The apparatus of claim 13, wherein the one or more processors are configured to change the distribution of the redundant subcarriers by one or more of changing a bandwidth used for the distribution of the redundant subcarriers, shifting subcarriers within a bandwidth that are used for the distribution of the redundant subcarriers, or shifting subcarriers outside of a bandwidth used for the distribution of the redundant subcarriers.

15. An apparatus for wireless communication, comprising:
a transceiver;
a memory configured to store instructions;
one or more processors communicatively coupled with the memory and the transceiver, wherein the one or more processors are configured to:
receive a unique-word orthogonal frequency division multiplexing (UW-OFDM) waveform;
generate a mapping of subcarriers by performing a fast Fourier transform (FFT) of the UW-OFDM waveform;
demap, from the mapping of subcarriers, a permutation of a set of redundant subcarriers and a set of data subcarriers, wherein the set of redundant subcarriers is based at least on multiple head samples and multiple tail samples included in the UW-OFDM waveform;

separate, based on a permutation matrix, the permutation of the set of redundant subcarriers and the set of data subcarriers; and process the set of data subcarriers to obtain data transmitted in the UW-OFDM waveform.

16. The apparatus of claim 15, wherein the multiple head samples are one of zero samples or a sequence of samples.

17. The apparatus of claim 16, wherein the one or more processors are further configured to receive a configuration indicating whether the multiple head samples are the zero samples or the sequence of samples.

18. The apparatus of claim 15, wherein the one or more processors are further configured to receive a configuration indicating presence of the multiple head samples in the UW-OFDM waveform, wherein the one or more processors are configured to demap the multiple head samples based on receiving the configuration.

19. The apparatus of claim 15, wherein the one or more processors are further configured to receive, from a base station, an indication of a distribution of the set of redundant subcarriers within the permutation of subcarriers, wherein the one or more processors are configured to separate the permutation of the set of redundant subcarriers and the set of data subcarriers based on the indication of the distribution.

20. The apparatus of claim 19, wherein the one or more processors are further configured to transmit, to the base station, a request for a certain distribution of the set of redundant subcarriers.

21. The apparatus of claim 19, wherein the one or more processors are further configured to transmit, to the base station, a capability indication of one or more distributions of the set of redundant subcarriers.

22. The apparatus of claim 19, wherein the distribution of the set of redundant subcarriers corresponds to one of a symbol or a slot.

23. The apparatus of claim 22, wherein the one or more processors are further configured to receive, from the base station, an indication of changing the distribution of redundant subcarriers in one of a next symbol or a next slot.

24. The apparatus of claim 23, wherein the one or more processors are configured to change the distribution of the redundant subcarriers by one or more of changing a bandwidth used for the distribution of the redundant subcarriers, shifting subcarriers within a bandwidth that are used for the distribution of the redundant subcarriers, or shifting subcarriers outside of a bandwidth used for the distribution of the redundant subcarriers.

25. A method for wireless communications, comprising:
adding a set of redundant subcarriers to a set of data subcarriers to be transmitted in a unique-word orthogonal frequency division multiplexing (UW-OFDM) waveform, wherein the set of redundant subcarriers is based at least on multiple head samples and multiple tail samples to be included in the UW-OFDM waveform;

interleaving, based on a permutation matrix, the set of redundant subcarriers with the set of data subcarriers to generate a permutation of subcarriers;

mapping the permutation of subcarriers as input to an inverse fast Fourier transform (IFFT); and generating the UW-OFDM waveform based on output of the IFFT.

26. A method for wireless communications, comprising:
receiving a unique-word orthogonal frequency division multiplexing (UW-OFDM) waveform;

generating a mapping of subcarriers by performing a fast Fourier transform (FFT) of the UW-OFDM waveform;

demapping, from the mapping of subcarriers, a permutation of a set of redundant subcarriers and a set of data subcarriers, wherein the set of redundant subcarriers is based at least on multiple head samples and multiple tail samples included in the UW-OFDM waveform;

separating, based on a permutation matrix, the permutation of the set of redundant subcarriers and the set of data subcarriers; and processing the set of data subcarriers to obtain data transmitted in the UW-OFDM waveform.

* * * * *